Dec. 16, 1930.   H. M. WOLFSON   1,784,952
EDUCATIONAL APPLIANCE
Filed Feb. 20, 1929

INVENTOR.
Harold M. Wolfson
BY Chapin & Neal
ATTORNEYS.

Patented Dec. 16, 1930

1,784,952

UNITED STATES PATENT OFFICE

HAROLD M. WOLFSON, OF NEW YORK, N. Y., ASSIGNOR TO MILTON BRADLEY COMPANY, OF SPRINGFIELD, MASSACHUSETTS, A CORPORATION OF MASSACHUSETTS

EDUCATIONAL APPLIANCE

Application filed February 20, 1929. Serial No. 341,504.

This invention relates to an educational appliance for teaching children color blending combinations and whereby such instruction is imparted by the use of the appliance in such a subtle way that the child is not particularly conscious of the instruction being imposed upon him. In addition, the idea of the invention is to provide a container in which crayons, tubes of color, paint or other color material, may be packed for sale and serve as a convenient receptacle for the user and the same structure or container, with its contents, serving as the educational appliance.

A simple illustration of my invention with one variation is shown in the accompanying drawings.

Figure 1:
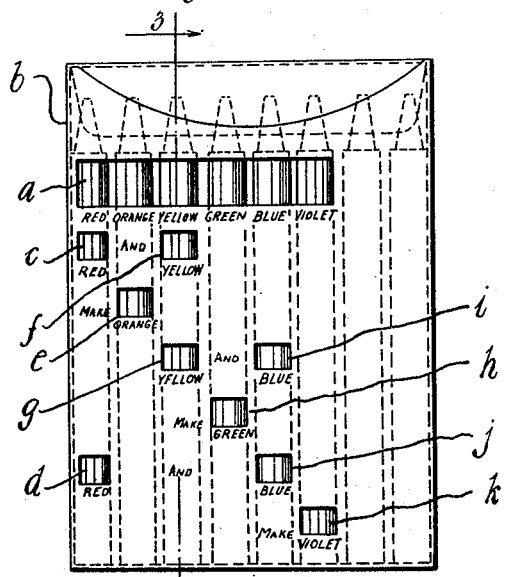
Fig. 1 shows a crayon box with colored crayons therein all arranged according to one form of the invention.
Figure 3:
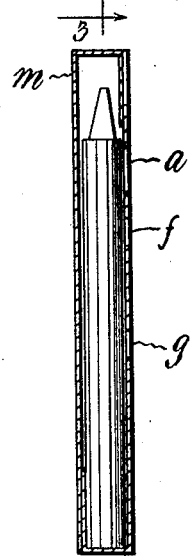
Fig. 3 shows a section through line 3—3 of Fig. 1.

The preferred form of the invention is shown in Fig. 1. I start with a crayon box of an ordinary commercial form such as the usual pasteboard box container in which colored crayons are commonly sold with the crayons arranged in a single row. I arrange in the box $b$ a set of crayons in the row beginning at the left, in the order of the colors, red, orange, yellow, green, blue, and violet. Then I provide an open narrow horizontal window $a$ through the front face of the box just below its upper edge, so that the contained row of crayons may be seen through the window. The color of each crayon is visible either by reason of its composition color, or if the crayon is wrapped with a corresponding colored wrapper as is common to prevent smudging, then such wrapping color is visible, so the result is the same. Along the edge of the window on the front face of the box and in line with the appropriate crayon, I print the colors red, orange, yellow, green, blue, and violet.

In line with the "red" crayon, I cut in the face of the box two vertically spaced little square windows $c$ and $d$. The only crayon or color that can be seen through these windows is the red crayon. I also cut similar windows $e$ in line with the orange crayon, $f$ and $g$ in line with the yellow crayon, $h$ in line with the green crayon, $i$ and $j$ in line with the blue crayon, and $k$ in line with the violet crayon. It will be noted that through these small windows only the color of that crayon (or its corresponding colored wrapper) with which the window is in line, can be seen and that the visible color is due to the contents of the box arranged back of the windows.

To carry out my idea as to the educational appliance, it will be noted that I have grouped the small windows according to a definite plan. Thus, the top windows $c$ and $f$ for red and yellow are on the same horizontal line and just below this line and in this case between said two windows, the window $e$ for orange is arranged making up the first group of three small windows. Adjacent this group I print the fact that "Red and yellow make orange." The second group is arranged below and staggered with the first group and adjacent the appropriate windows I print "Yellow and blue make green." In the third group the lower "red" window $d$ is offset far to the left but in horizontal line with its coupled window $j$ and there is no difficulty in getting the visual association from such arrangement so that the printing "Red and blue make violet" is quite appropriate to this group in a similar manner to the others.

If it is preferred, my lower group may be arranged with not even a slight variation in the general appearance of such group. This is accomplished by having another "red" crayon adjacent the violet and placing the window $d$ in line with the window $j$ instead of where it has been shown. I prefer the arrangement shown in Fig. 1 since it calls for only one set of crayons without duplicating colors for all combinations of the several groups. I have shown the box $b$ with two extra crayons at the right, either for additional colors or duplicates, one or more of which may be used to vary the particular grouping, as I have indicated.

Figure 2:
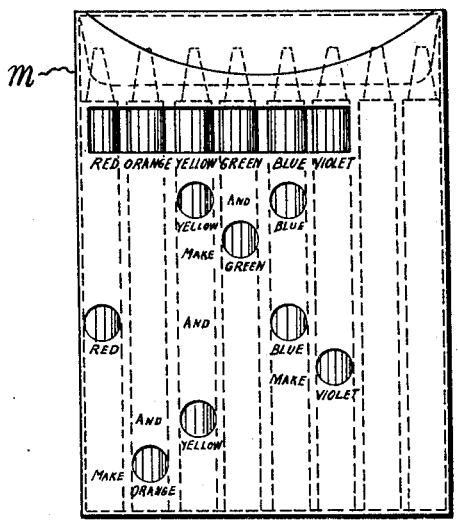
Fig. 2 shows a crayon box with colored crayons therein all arranged according to another form of the invention.

In Fig. 2 I show a box *m* similar to box *b* except that the small windows are shown round and the grouping is varied, but with the same fundamental idea of utility, as in Fig. 1.

Some of the advantages of, and reasons for, the structural arrangement will now be pointed out. One is the increased visibility or strengthened impression through the eye that the child gets in the use of my color tool box as contrasted with the ordinary color tool box which has no more than printed directions to impress the beginner in color study. My appliance results in such a close visual association between the contents of the box and the directions to be followed that the transition step in the mind of the young between the tools to be used, and the directions for instructive use, is shortened. Then the play instinct is appealed to by the desirability of properly arranging the color tools in the box through the use of the peek-holes offered by the small windows. The tool box is thus not a simple containing structure for the tools, but one of the tools itself, lending structure to the play element in the course of color instruction. The advantageous effects on the child, of my improved box could be dilated upon to a considerable extent, but what has been said is perhaps enough.

There are advantages to the manufacturer and retailer in the simplicity with which the box together with its contents is made an attractive and novel article for display purposes. In other words, it has a strong advertising appeal in trade channels. Ordinarily, a container or color tool box needs to be made attractive by the printing and label. With my structure, it is made attractive by using practically all the colors of the rainbow from the contents of the box, and not simply to display the contents but, by the arrangement or grouping of the windows, the small ones particularly, to arouse the curiosity as to the scheme back of such an unusual arrangement.

For the manufacturer, there is the advantage that the whole idea of the invention can be embodied in his ordinary type of crayon pasteboard box or box for tubes of color, and without increased expense, since all the windows can be cut out in the predetermined coordination at the time the box blank is cut. Furthermore, a less expensive label or decorative scheme on the face of the box can be adopted and is in fact an advantage since the background for the front of my educational appliance is preferably of the simplest character.

I have described three embodiments of the invention and it is obvious that the same idea can be carried out not only with crayons, but with tubes of water color or other color-making tools, in combination with such a tool box.

What I claim is:

1. A commercial package of color tools comprising, color-making articles each appropriately colored on its exterior and arranged in a row, a box container enclosing the row, said container having a plurality of groups of small windows or peek-holes through each of which only one of said articles is prominently visible by its color, the windows of each group having indicia associated therewith to suggest a factual color association for such group.

2. A commercial package of color tools comprising different color-making articles each appropriately colored on its exterior, a box container enclosing said articles, said container having a plurality of groups of small windows, through each of which windows only one color is prominently visible, the windows of each group having indicia associated therewith to suggest a factual color association for such group.

In testimony whereof I have affixed my signature.

HAROLD M. WOLFSON.